United States Patent Office.

PETER G. SCHLOSSER, OF MIDDLETOWN, ASSIGNOR TO HIMSELF AND A. P. BAER, OF BALTIMORE, MARYLAND.

Letters Patent No. 78,543, dated June 2, 1868.

IMPROVED COMPOSITION FOR DEPILATING HIDES.

The Schedule referred to in these Letters Patent and making part of the same.

TO ALL WHOM IT MAY CONCERN:

Be it known that I, PETER G. SCHLOSSER, of Middletown, in the county of Frederick, and State of Maryland, have invented a new and improved Composition for Depilating Hides; and I do hereby declare that the following is a full, clear, and exact description of the construction and operation of the same.

The object of this invention is to produce a composition by which hides, whether green or dry, can be depilated in an easy and expeditious manner, without destroying or injuring the material of the hide, and so as to produce a greater percentage, in weight, of leather, than is possible by any other process.

The composition which I have discovered, and which I have proved by a long course of experiment and trial to be a very valuable one for the purpose above specified, consists of one-quarter of a pound nitrate of potassa, one quart chloride of sodium, four and one-half pints sulphuric acid, one ounce tartaric acid, or, in lieu thereof, one pint vinegar, twelve pounds wheat-bran, and five hundred gallons of sour or spent tan-liquor. These ingredients are properly commingled, and are then applied to the depilation of dry or imported hides in the usual manner.

In treating green hides, the first two ingredients, nitrate of potassa and chloride of sodium, and the wheat-bran, are to be omitted from the mixture, their functions being solely to soften the hard dry Spanish or imported hide, and to reduce it to a condition similar to the normal condition of the green hide.

By employing this composition in depilating hides, all the injurious consequences of the use of lime for that purpose are avoided. The substance of the hide itself is not eaten away and destroyed, as is always the case when lime is used, but all its body and strength are preserved, and a greater amount of leather is produced than it is possible to obtain when lime is employed in any manner.

By this process, twenty-five pounds of the dry hide will produce about forty pounds of leather, and one hundred pounds of green hide will produce about seventy pounds of leather.

Besides this, the time heretofore consumed in "bating" or cleansing the hide from the lime, occupying several days usually, is entirely saved, and the whole process of preparing the material for tanning is, in that degree, shortened.

Having thus described my invention, what I claim as new, and desire to secure by Letters Patent, is—

1. The composition, substantially as above described, for depilating dry hides.
2. The composition, substantially as above described, for depilating green hides.

To the above specification of my invention, I have signed my hand, this 5th day of May, 1868.

PETER G. SCHLOSSER.

Witnesses:
SOLON C. KEMON,
CHAS. A. PETTIT.